United States Patent [19]
Frlan

[11] Patent Number: 6,047,178
[45] Date of Patent: Apr. 4, 2000

[54] DIRECT COMMUNICATION WIRELESS RADIO SYSTEM

[75] Inventor: Edward Frlan, Kanata, Canada

[73] Assignee: Nortel Networks Corporation, Montreal, Canada

[21] Appl. No.: 08/995,219

[22] Filed: Dec. 19, 1997

[51] Int. Cl.[7] .................................................... H04Q 7/20

[52] U.S. Cl. .......................................... 455/423; 455/450

[58] Field of Search ..................................... 455/423, 450

[56] References Cited

U.S. PATENT DOCUMENTS

| | | | |
|---|---|---|---|
| 5,878,342 | 3/1999 | Gustafson et al. | 455/423 |
| 5,898,928 | 4/1999 | Karlsson et al. | 455/450 |
| 5,905,956 | 5/1999 | Young et al. | 455/450 |
| 5,909,649 | 6/1999 | Saunders | 455/450 |

*Primary Examiner*—Paul Loomis

[57] ABSTRACT

A method of providing direct communication between a pair of mobile stations over a single voice channel is disclosed, as well as a novel mobile station equipped with the capability to function in a so-called base-station-emulation (BSE) mode. A mobile switching center (MSC) first determines whether direct communication between two mobile stations is possible, by verifying that at least one of them can function in BSE mode. The MSC then establishes whether a clear radio link between the two mobile stations can be established and assigns a single voice channel for the conversation. In this way, the number of base station transceivers required to service a cell can be reduced. If the locations of the two mobile stations are known, feasibility of direct communication can be easily determined. Optionally, the MSC might order the two mobile stations to exchange modulated audio tones and report measured received signal strengths. Direct communication is then established subject to an evaluation by the MSC. The one mobile station chosen to operate in BSE mode is ordered to "swap" its transmit and receive frequencies, and the direct call is begun. Termination of the call by the mobile station that has remained in "normal" mode is detected by the mobile station in BSE mode, and termination of the call by the mobile station in BSE mode is detected by the base station.

31 Claims, 4 Drawing Sheets

A - normal mode

B - "base station emulation" mode

DIRECT COMMUNICATION WIRELESS RADIO SYSTEM

FIELD OF THE INVENTION

This invention relates to wireless communications networks and more specifically to a method of enabling pairs of mobile stations in a wireless network to communicate directly with each other.

Background of the Invention

Modern cellular telecommunications networks are divided into cells which service mobile stations (mobile phones) in a defined area. Each cell contains a base station which exchanges voice and control information with mobile stations located within the cell's coverage area, and base stations from various cells communicate with each other through a mobile switching center.

In a fixed wireless network, mobile stations are constrained to a small geographic area, usually within the same cell. Installation of such networks is common when telecommunications are required in regions not equipped with a prior communications infrastructure, e.g., new housing developments or relatively affluent third world communities. Furthermore, it is often the case that telephone calls placed by members of a cell reach users within the same cell, such as neighbourhood friends.

A large part of the cost of a cellular network, be it fixed or truly mobile, lies with the numerous base stations that need to be deployed. Base station cost, for its part, is largely concentrated in the transceivers required to maintain communication with the mobile stations. When two mobile stations within the same cell communicate with one another, they each take up one voice channel at the base station, occupying a total of two transceivers per pair of communicating mobile stations.

The number of intra-cell calls that a base station can handle is therefore on the order of half the available channels, a corollary being that free channels will expire approximately twice as fast as calls are made. When all of a base station's transceivers are busy, mobile stations not actively involved in a conversation cannot place or receive calls until a channel is liberated. Worse still, if both the originator and potential recipient of a new call reside within the same cell (whose base station transceivers are occupied), then the call cannot be effected until two channels are freed at the base station.

Yet other problems are inherent to current wireless systems. For example, in a conventional network, two mobile stations in close proximity to each other but located relatively far from their common base station may find that their connection suffers from poor voice quality or is sometimes dropped. The explanation lies in the severe degradation that plagues the signal from one mobile station as it makes its way to the base station and again and towards the other mobile station. Furthermore, establishing communication with a distant base station (sometimes as far away as 20 kilometers) demands substantial power consumption on the part of the mobile stations. This has the deleterious effect of reducing the time interval between recharges of a mobile station.

SUMMARY OF THE INVENTION

It is an object of the present invention to mitigate or obviate one or more disadvantages of the prior art.

To this end, the present invention can be summarized according to a first broad aspect as a mobile station for use in a telecommunications network and being capable of operation in a normal mode and in a base station emulation (BSE) mode, the network comprising a plurality of mobile stations including the BSE capable mobile station, a plurality of base stations and a mobile switching center, the mobile switching center communicating with the plurality of base stations, each base station communicating with one or more mobile stations, the BSE capable mobile station comprising: circuitry for switching between normal mode and BSE mode; wherein operation of the mobile station in normal mode consists of reception over a forward channel and transmission over a reverse channel and operation of the mobile station in BSE mode consists of reception over the reverse channel and transmission over the forward channel; wherein the mobile station switches from normal mode into BSE mode upon receiving an instruction from the respective base station, wherein the mobile station can establish direct communication with another mobile station of the plurality of mobile stations.

The present invention can be summarized according to a second broad aspect as a telecommunications network comprising: a plurality of mobile stations, at least one of which is capable of operation in a normal mode and in a base-station-emulation (BSE) mode, the BSE capable mobile station comprising circuitry for switching between normal mode and BSE mode; a plurality of base stations, each base station communicating with one or more mobile stations; and a mobile switching center communicating with the plurality of base stations; wherein operation of the mobile stations in normal mode consists of reception over a forward channel and transmission over a reverse channel and operation of the PSE capable mobile station in BSE mode consists of reception over the reverse channel and transmission over the forward channel; wherein the BSE capable mobile station switches from normal mode into BSE mode upon receiving an instruction from the respective base station whereby the BSE capable mobile station establishes direct communication with another mobile station of the plurality of mobile stations.

The present invention can be summarized according to a third broad aspect as a method of enabling direct communication between first and second mobile stations in a telecommunications network, the network comprising a plurality of mobile stations, at least one of which is capable of operation in a normal mode and in a base-station-emulation (BSE) mode, the BSE capable mobile station comprising circuitry for switching between normal mode and BSE mode; a plurality of base stations, each base station communicating with one or more mobile stations; and a mobile switching center communicating with the plurality of base stations; wherein operation of the mobile station in normal mode consists of reception over a forward channel and transmission over a reverse channel and operation of the mobile station in BSE mode consists of reception over the reverse channel and transmission over the forward channel; wherein the mobile station switches from normal mode into BSE mode upon receiving a indication from the base station, the first and second mobile stations communicating in normal mode with a respective base station among the plurality of base stations, the method comprising:

A) the first mobile station sending, via the respective base station, a message to the mobile switching center indicating that the second mobile station is being called;

B) the mobile switching center sending a page message to the second mobile station via the specific base station;

C) the second mobile station responding to the page message;

D) the mobile switching center determining whether at least one of the first and second mobile stations is capable of operating in BSE mode and identifying the one mobile station that is to operate in BSE mode;

E) the mobile switching center determining whether a clear radio link between the first and second mobile stations can be maintained;

F) if steps d) and e) result in a positive determination, the mobile switching center assigning forward and reverse channels for the call;

G) the mobile switching center sending, via the respective base station, a request message to the mobile station identified in step d) instructing it to operate in BSE mode;

H) the BSE capable mobile station responding to the request message and switching into BSE mode;

I) the BSE capable station establishing a direct call with the other of the first and second mobile stations.

BRIEF DESCRIPTION OF THE DRAWINGS

The preferred embodiment of the present invention will now be described with reference to the following figures, in which.

DETAILED DESCRIPTION OF THE PREFERRED EMBODIMENT

Figure 1A:
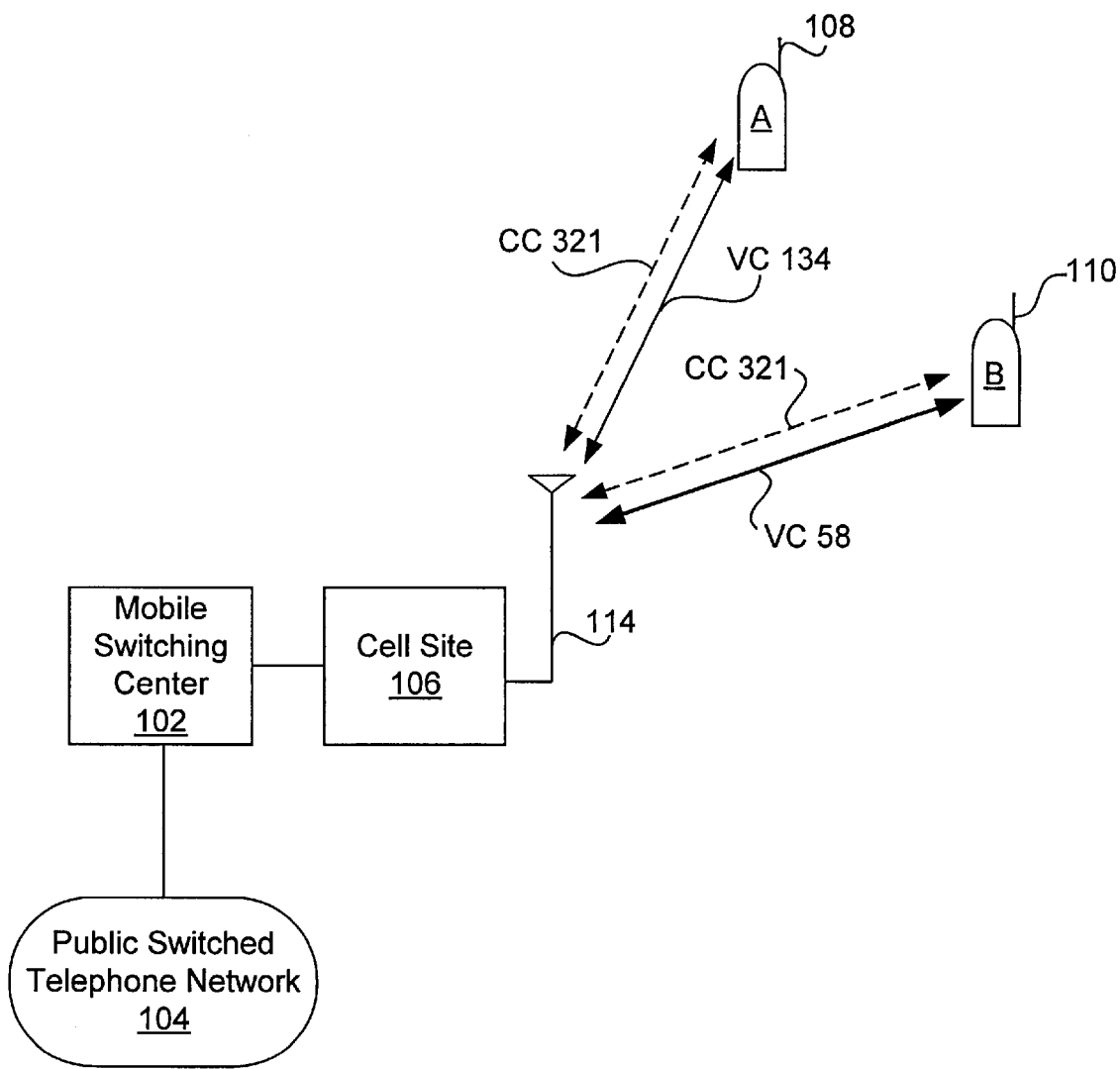
FIG. 1A shows part of a prior art wireless cellular telecommunications network.

In FIG. 1A is shown part of a wireless cellular telecommunications network, consisting of a mobile switching center (MSC) 102 connected to a base station 106 at a given cell site and to the remainder of the network 104. Mobile stations A and B communicate with the base station 106 through wireless links established between respective antennas 108,110 at the mobile stations A,B and an antenna 114 at the base station 106.

The base station exchanges control information with mobile stations over a control channel (CC), separated into a forward control channel (FCC) and a reverse control channel (RCC) usually shared among the mobile stations. On the other hand, separate voice channels (VCs) carry voice information over the same wireless link, each VC separated into a forward voice channel (FVC) for base-station-to-mobile-station voice communication and a reverse voice channel (RVC) that supports voice communication in the opposite direction.

An exemplary analog system currently in use and in respect of which the present invention applies is the Advanced Mobile Phone Service (AMPS, specified by the Electronics Industries Association EIA-553 specification, and hereby incorporated by reference herein), which provides 333 commonly available channels, each occupying a different frequency range further bisected into a portion for the forward channel and another for the reverse channel. A cell usually shares these 333 channels with six neighbours, and is usually assigned a total of 48 ($\cong$333/7) channels for use within the cell. The present invention also applies to other analog cellular standards such as the Nordic Mobile Telephone (NMT) network and the Total Access Communication System (TACS).

When in use, i.e., when in a so-called "conversation state", each mobile station transponds a supervisory audio tone (SAT) to the base station over the RVC. The base station continually monitors the SAT and if at any time the mobile station fails to transpond the SAT, e.g., due to obstruction of the wireless link, the MSC in charge of the base station will initiate a call release routine. A mobile station may also trigger the call release routine by sending a signalling tone (ST) to the base station, also over the RVC, and subsequently ceasing transmission. This procedure is commonly referred to as "hanging up".

A traditional approach to setting up a call between two mobile stations A and B located within the same cell is now briefly described with reference to FIG. 1A. Assuming that mobile station A wishes to place a telephone call to mobile station B, it communicates this intention to the base station via the control channel, say 321; the base station subsequently informs the MSC. If mobile station B is ready to accept the call, and if there are at least two available transceivers at the base station, the MSC will assign one voice channel, say 134, to mobile station A and another, say 58, to mobile station B. The MSC communicates this information to the base station which informs each mobile station of its respective assigned voice channel via the control channel.

Conventionally, therefore, a telephone call between two co-cellular mobile stations A and B passes through the base station, occupying two voice channels, i.e., two base station transceivers. Specifically, the base station transmits to mobile station A over the FVC of channel 134 and mobile station A transmits to the base station over the RVC of channel 134. Similarly, the base station similarly exchanges voice information with mobile station B over the FVC and RVC of channel 58.

Figure 1B:
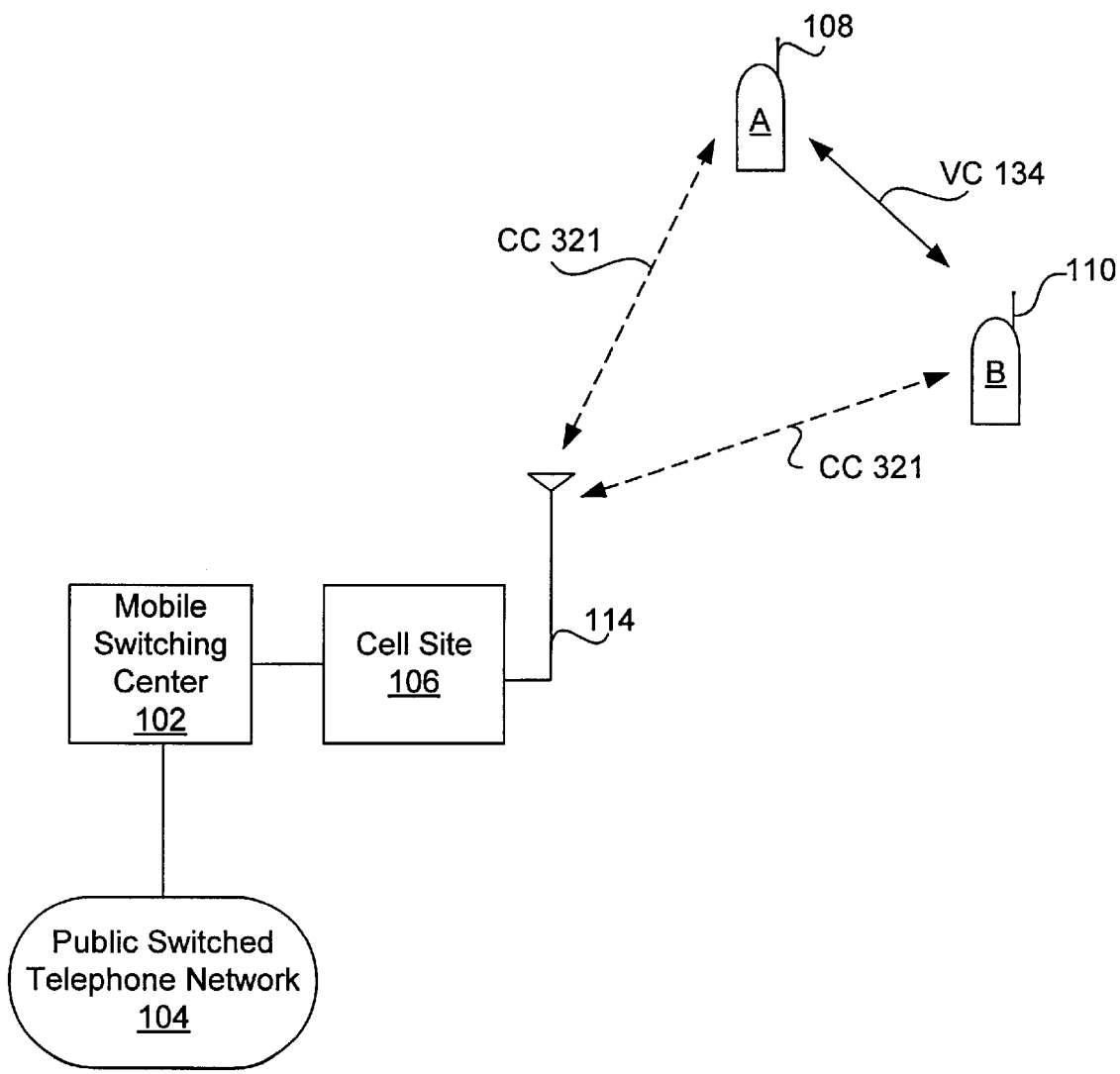
FIG. 1B illustrates direct communication between a pair of mobile stations as contemplated by the present invention.

In contrast, the present invention lets both mobile stations A and B communicate directly with each other, using the same voice channel, thus allowing the base station to simultaneously process more calls or to be designed for accommodating fewer transceivers. A key ingredient that permits direct communication between a pair of mobile stations is the ability of at least one mobile station to switch into a so-called "base station emulation" (BSE) mode, in which transmission over the FVC and reception over the RVC of a given voice channel is enabled. Referring now to FIG. 1B, mobile station B is empowered with BSE mode capability and direct communication between the two mobile stations can take place on voice channel 134, effectively liberating voice channel 58 and allowing other connections to be established by the actual base station in the cell. The control channel 321 is still used to maintain communication between the mobile stations and the base station.

Figure 2:
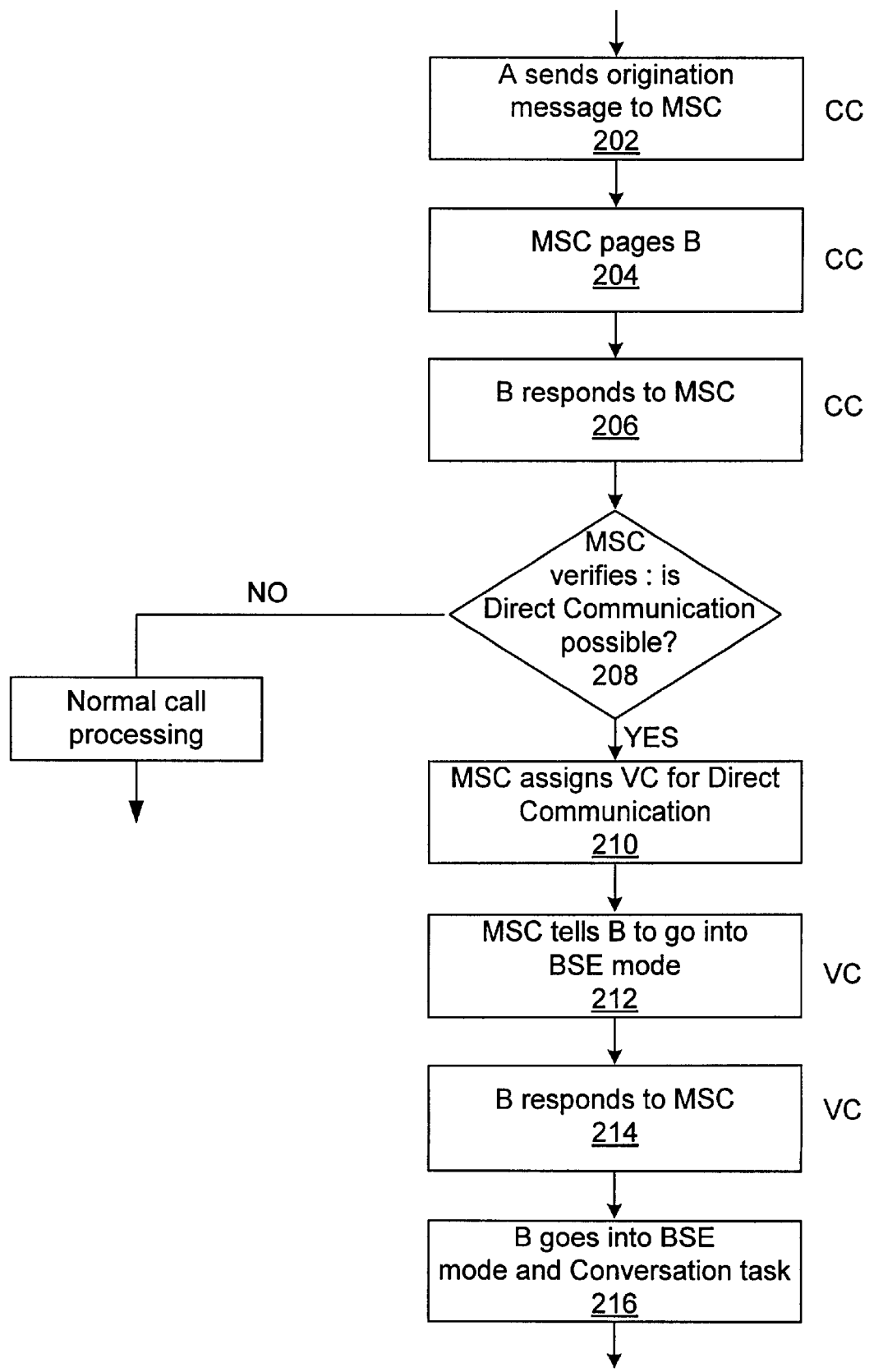
FIG. 2 is a flowchart illustrating the steps required to enable direct communication of two mobile stations in accordance with the present invention.

A sequence of steps for setting up a call between mobile station A and mobile station B in accordance with the present invention is now described with reference to FIG. 2. The two mobile stations are assumed to be located within a common cell served by a base station and a mobile switching center (MSC). Moreover, a single control channel is used to communicate control information between the base station and mobile stations A and B.

Although it is preferable that two mobile stations wishing to establish direct communication be located within the same cell, the present invention is also applicable in cases where the mobile stations are in adjoining cells but proximate each other, and therefore close to the cells' common boundary. If the MSC has information pertaining to the location of each mobile station, which it may well in a fixed wireless network, then it is possible for the MSC to initiate direct communication with the two mobile stations in the same manner as for the case in which both mobile stations are within the same cell. Since each cell ordinarily uses different voice channels from those of its neighbours, one of the two mobile stations would be ordered to tune to a channel, i.e., a frequency range, that is not normally used within its own cell.

Step 202

Mobile station A, upon attempting to reach mobile station B, automatically sends an origination message destined for the MSC. This message is first sent to the base station via the control channel, and is relayed to the MSC by the base station.

Step 204

The MSC instructs the base station to page mobile station B over the control channel.

Step 206

Mobile station B "wakes up" and responds to the base station over the control channel, indicating that it is ready for a conversation. The base station relays this message to the MSC.

Step 208

The MSC now checks to see whether direct communication between the two mobile stations is possible, i.e., if two essential criteria are satisfied. The order in which they are tested is not essential to the present invention. First, at least one of the two mobile stations must be capable of functioning in BSE mode. This can be determined, for example, by searching for the mobile identification number of either mobile station in a database containing mobile identification numbers of mobile stations manufactured with BSE mode capability.

If the first criterion is met, the base station must then determine whether the two mobile stations are in sufficient proximity to each other that a clear radio signal can be maintained. This can be achieved in a variety of ways, such as utilizing so-called extended 911 services or consulting a received signal strength indicator (RSSI) matrix. Extended 911 (or E911) services, akin to the familiar 911 services in the North American wireline network, allow the MSC to calculate the position of any mobile station in order to dispatch emergency services to a subscriber. The practical implication with regard to the present invention is that if mobile station B is found to be within a certain threshold distance (say, less than 1 kilometer (km) in a radio propagation environment with little signal attenuation or fading due to buildings and other obstructions) of mobile station A, then direct communication between the two mobile stations is deemed possible.

In a fixed wireless network, the use of E911 services is not necessary, as relatively accurate knowledge of the position of each mobile station is readily available upon installation of the network. However, the size and geography of a cell does not necessarily permit direct communication between any pair of mobile stations in the cell. RSSI information in the form of a matrix can be used in order to evaluate the feasibility of direct communication between mobile stations in different sub-regions of a cell.

In an exemplary embodiment of a cell, there may be four sub-regions a,b,c,d which in an urban setting could be considered as large neighbourhoods having diameters of approximately 1 km. The RSSI between two sub-regions is defined as the strength of a signal between two mobile stations, one in each sub-region, relative to a nominal value. For a given pair of sub-regions, the RSSI value is either measured directly during installation or modelled using radio propagation theory. It is convenient to represent the RSSI information on the form of a matrix, where $R_{xy}$ is the RSSI between sub-regions x and y of the cell:

$$RSSI_{cell} = \begin{bmatrix} R_{aa} & R_{ab} & R_{ac} & R_{ad} \\ R_{ba} & R_{bb} & R_{bc} & R_{bd} \\ R_{ca} & R_{cb} & R_{cc} & R_{cd} \\ R_{da} & R_{db} & R_{dc} & R_{dd} \end{bmatrix}.$$

Another way of determining the feasibility of direct communication is for the mobile switching center ordering a first "candidate" mobile station to send a known modulated audio tone of a certain duration to a second "candidate" mobile station over a pre-assigned voice channel. The second candidate measures the received signal strength and then forwards this data to the base station. A reciprocal transmission and detection are performed, the results of which are relayed to the base station by the first candidate. The reception quality data for both directions of communication are sent to the MSC, which compares these results to some known values in deciding whether a clear radio link can be established between the two candidate mobile stations. Clearly, use of this technique requires that both mobile stations be adapted for transmission and reception of suitable modulated audio tones, which in practical terms would mean that they would have to be BSE capable mobile stations according to the present invention.

Irrespective of the evaluation methods employed, if either criterion is not met, i.e., if direct communication between the two mobile stations A and B is not achievable, then subsequent steps for placing the call correspond to the known procedure as used in the prior art.

Step 210

On the other hand, if direct communication between mobile stations A and B is possible, the MSC must find a free voice channel that will be assigned to carry the telephone call, say VC1.

Step 212

Since both criteria outlined in step 208 have necessarily been passed at this stage, at least one mobile station is capable of functioning in BSE mode. The MSC will already know this fact and, by way of the base station, now orders one mobile station to enter BSE mode. Clearly, if both mobile stations have BSE mode capability, a straightforward algorithm can be applied to choose the one mobile station that will actually be requested to enter BSE mode.

For the sake of argument, it is assumed that mobile station B has been selected to emulate a base station. The base station will use so-called "blank and burst" signalling over the FVC on VC1 (the assigned voice channel) to tell mobile station B to enter BSE mode. In the AMPS standard, for example, the Order field in the FVC would be set to "local control" and a "base station emulation" command would be set in the Local/Message Type field.

Step 214

Upon recognizing that it is being requested to enter BSE mode, mobile station B complies by responding to the base station over the RVC of VC1. It then enters BSE mode, which consists of "swapping" its transmitter and receiver, i.e., mobile station B now transmits on the FVC and receives on the RVC of VC1.

Step 216

Mobile station B subsequently enters conversation state, during which it exchanges voice information with mobile station A over VC1 and continually monitors the SAT from mobile station A in the manner of a true base station.

Naturally, an aspect of wireless telephony that is just as important as setting up a call is the procedure by which a call is terminated, or torn down. A conventional approach to tearing down a call between two mobile stations A and B consists of the base station detecting from one of the mobile stations either a loss of the SAT or the presence of a ST and subsequently instructing the other mobile station to cease transmission. When two mobile stations are in direct communication with each other, however, the mobile station in BSE mode is not monitored or controlled by the base station, and must take its call termination cues from the other mobile station.

For explanatory purposes, it is assumed that of two mobile stations A and B in direct communication with each other over a voice channel VC1, mobile station B is in BSE mode. Clearly, either mobile station can be the first to release the call. In the case that mobile station B terminates the call, it will switch out of BSE mode (and back into "normal" mode), subsequently sending an ST to the base station over the RVC of VC1 and ceasing transmission. The base station detects this ST and, using the FVC of VC1, directs mobile station A, which has always been in normal mode, to cease transmission.

If mobile station A is first in releasing the call, it will send the ST over the RVC of VC1, which will be detected by mobile station B (in BSE mode), and then cease transmission. Mobile station B subsequently acts as if it were releasing the call, sending its own ST to the base station over the RVC of VC1 after having switched back into normal mode. Preferably, therefore, an ST to be transmitted by mobile station A and intercepted by mobile station B.

Alternatively, mobile station B could be designed to monitor the SAT sent out by mobile station A over the RVC of VC1. If at any time mobile station A fails to transpond a SAT then this will be detected by both the base station and mobile station B. Mobile station B thus assumes that mobile station A has hung up, and proceeds with the call release mechanism. This inferential method does not rely on a direct command to tear down a call, but concludes from lack of a SAT that mobile station A wishes to end communication.

It is to be understood that out of two mobile stations wishing to establish direct communication, only one mobile station need have BSE mode capability. Hence, an ordinary mobile phone is not necessarily precluded from participating in direct communication, so long as its "partner" can function in BSE mode. Moreover, if direct communication is not possible, then communication in the usual (prior art) way is established.

Figure 3:
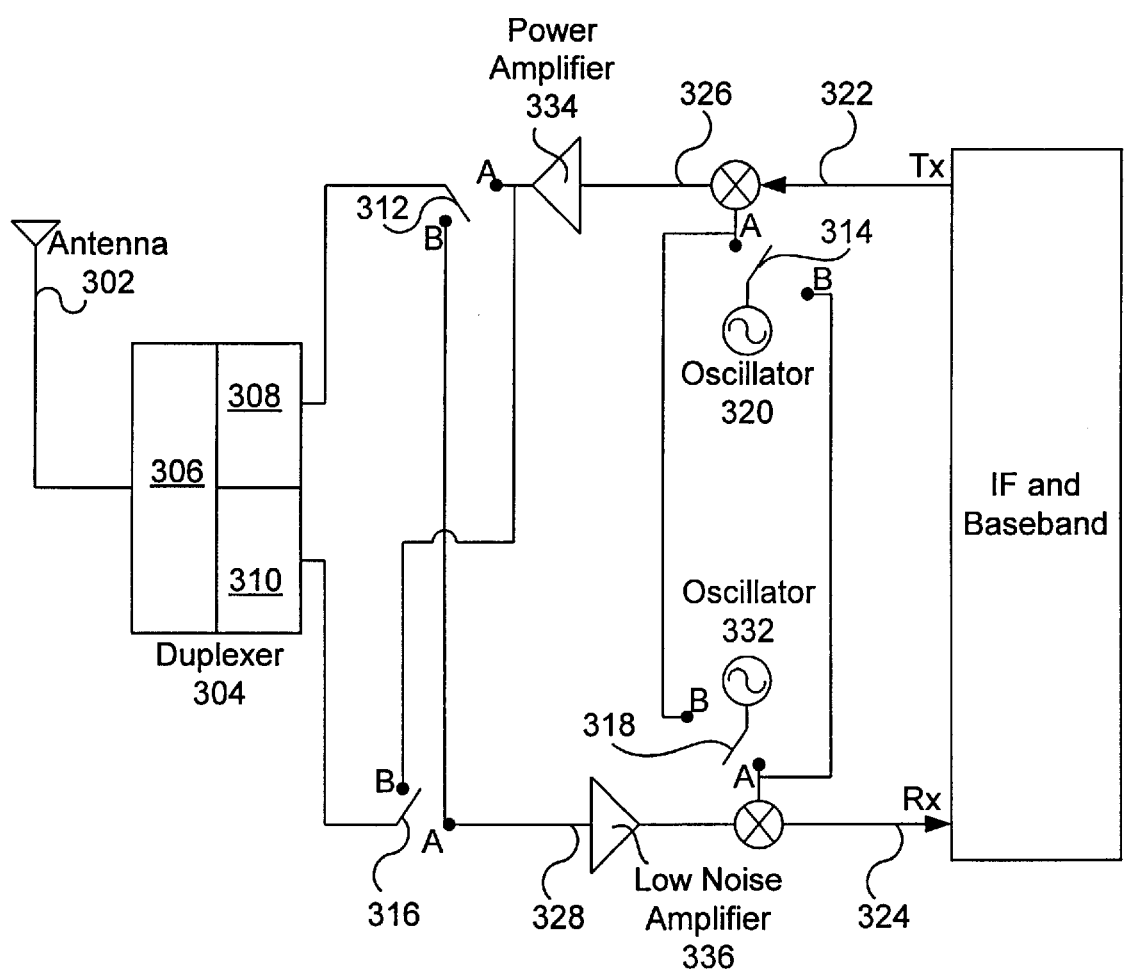
FIG. 3 is a block diagram of RF circuitry used in a mobile station that has been adapted to possess base station emulation functionality.

Several features that at least one mobile station in a pair must possess in order that both may benefit from direct wireless communication are now described. Most importantly, BSE mode capability requires that transmission and reception from a mobile station, which normally occur over the respective RVC and FVC of a voice channel, can instead be made to take place over the FVC and RVC, respectively. To this end, FIG. 3 is a simplified block diagram of a configurable channel swapping radio as would be used in a BSE capable mobile station.

An antenna 302 serves to transmit and receive radio frequency signals which are merged by a duplexer 304 with three ports 306,308,310 tuned to specific frequencies. There are four sets of single-pole double-throw reflective switches 312,314,316,318 with possible positions of A or B. In position A the mobile station acts as a conventional cellular phone. An oscillator 320 produces a carrier signal in the frequency range of the RVC, which multiples an intermediate-frequency (IF) transmit signal 322, yielding a radio-frequency (RF) transmit signal 326. The RF transmit signal 326 passes through port 308 of the duplexer 304 on its way to the antenna 302 via port 306.

Conversely, a signal arriving at the antenna 302 passes through port 306 of the duplexer and emerges from it at port 310 as a RF receive signal 328. This signal is multiplied by a carrier signal in the frequency range of the FVC generated by an oscillator 332, i.e., the RF receive signal 328 is effectively demodulated down to an IF receive signal 324.

When the mobile station enters BSE mode, the B position is engaged, and the IF transmit signal 322 is modulated up to a RF transmit signal 326 by the output of oscillator 332, which is in the frequency range of the FVC, and finds its way towards the antenna 302 through ports 310 and 306 of the duplexer 304. Similarly, through ports 306,308 of the duplexer 304 and switch 312 in position B arrives a RF receive signal 328, which is now demodulated down to an IF receive signal 324 by the output of oscillator 320 in the frequency range of the RVC.

It will be apparent to one skilled in the art that a power amplifier 334 and a low-noise linear amplifier are usually added in series with respective radio-frequency transmit and receive signals 326,328 and that filtering not shown in the illustration may be required to isolate certain frequency components at various stages of a signal's path.

In summary, mobile stations need to possess certain hardware and software/firmware capabilities in order to function in BSE mode. In particular, additional hardware elements required by the present invention include circuitry for switching between normal and BSE modes and when in BSE mode, transmitting and receiving over both the FVC and RVC of a given voice channel and detecting an ST (and optionally an SAT) from another mobile station. Mobile station software or firmware must also be enhanced to include additional functionality for interpreting and responding to a request from the MSC for the mobile station to enter BSE mode, switching into and out of BSE mode and, while in BSE mode, controlling SAT cutoff and ST detection (and optionally SAT cessation detection.) If, in addition, "interactive" measurement of modulated audio tone levels is to be performed, then a capability to transmit and detect suitable modulated audio tones would be required.

Although the preferred embodiment of the present invention is best described within the context of an analog cellular system, additional signal processing in the mobile stations, along with modifications to presently used digital air-interface standards such as the Telecommunication Industries Association IS-54 (Time Division Multiple Access or TDMA) specification and the Global System for Mobile Communications (GSM), can enable direct communication between mobile stations in a digital network.

While the preferred embodiment of the invention has been described and illustrated it will be apparent to one skilled in the art that variations in the design may be made. The scope of the invention, therefore, is only to be limited by the claims appended hereto.

I claim:

1. A mobile station for use in a telecommunications network and being capable of operation in a normal mode and in a base station emulation (BSE) mode, the network comprising a plurality of mobile stations including the BSE capable mobile station, a plurality of base stations and a mobile switching center, the mobile switching center communicating with the plurality of base stations, each base station communicating with one or more mobile stations, the BSE capable mobile station comprising:

circuitry for switching between normal mode and BSE mode;

wherein operation of the mobile station in normal mode consists of reception over a forward channel and transmission over a reverse channel and operation of the mobile station in BSE mode consists of reception over the reverse channel and transmission over the forward channel;

wherein the mobile station switches from normal mode into BSE mode upon receiving an instruction from the respective base station, wherein the mobile station can establish direct communication with another mobile station of the plurality of mobile stations.

2. A mobile station according to claim 1, further comprising circuitry for switching the mobile station from BSE mode into normal mode upon the mobile station terminating the direct communication with the other mobile station, and for transmitting a signalling tone to the respective base station thereby to advise the mobile switching center of the termination of direct communication.

3. A mobile station according to claim 1, further comprising circuitry for detecting during operation in BSE mode, a signalling tone sent by the other mobile station upon terminating the direct communication and for switching the mobile station from BSE mode into normal mode upon detection of the signalling tone and sending another signalling tone to the respective base station thereby to advise the mobile switching center of the termination of direct communication.

4. A mobile station according to claim 2, further comprising circuitry for detecting during operation in BSE mode, a signalling tone sent by the other mobile station upon terminating the direct communication and for switching the mobile station from BSE mode into normal mode upon detection of the signalling tone and sending another signalling tone to the respective base station thereby to advise the mobile switching center of the termination of direct communication.

5. A mobile station according to claim 1, further comprising circuitry for detecting during operation in BSE mode a supervisory audio tone sent by the other mobile station during the direct communication, for switching the mobile station from BSE mode to normal mode on detecting loss of the supervisory audio tone and for sending a signalling tone to the base station on detecting loss of the supervisory audio tone thereby to advise the mobile switching center of termination of direct communication.

6. A mobile station according to claim 2, further comprising circuitry for detecting during operation In BSE mode a supervisory audio tone sent by the other mobile station during the direct communication, for switching the mobile station from BSE mode to normal mode on detecting loss of the supervisory audio tone and for sending a signalling tone to the base station on detecting loss of the supervisory audio tone thereby to advise the mobile switching center of termination of direct communication.

7. A mobile station according to claim 1, further comprising circuitry which, on receipt of an instruction from the respective base station while the mobile is in normal mode, causes the mobile station to transmit a first predetermined audio tone over a first pre-assigned channel and circuitry for measuring the strength of the received audio tone and transmitting to the respective base station an indication of the measured strength.

8. A mobile station according to claim 2, further comprising circuitry which, on receipt of an instruction from the respective base station while the mobile is in normal mode, causes the mobile station to transmit a first predetermined audio tone over a first pre-assigned channel and circuitry for measuring the strength of the received audio tone and transmitting to the respective base station an indication of the measured strength.

9. A mobile station according to claim 3, further comprising circuitry which, on receipt of an instruction from the respective base station while the mobile is in normal mode, causes the mobile station to transmit a first predetermined audio tone over a first pre-assigned channel and circuitry for measuring the strength of the received audio tone and transmitting to the respective base station an indication of the measured strength.

10. A mobile station according to claim 4, further comprising circuitry which, on receipt of an instruction from the respective base station while the mobile is in normal mode, causes the mobile station to transmit a first predetermined audio tone over a first pre-assigned channel and circuitry for measuring the strength of the received audio tone and transmitting to the respective base station an indication of the measured strength.

11. A mobile station according to claim 5, further comprising circuitry which, on receipt of an instruction from the respective base station while the mobile is in normal mode, causes the mobile station to transmit a first predetermined audio tone over a first pre-assigned channel and circuitry for measuring the strength of the received audio tone and transmitting to the respective base station an indication of the measured strength.

12. A mobile station according to claim 6, further comprising circuitry which, on receipt of an instruction from the respective base station while the mobile is in normal mode, causes the mobile station to transmit a first predetermined audio tone over a first pre-assigned channel and circuitry for measuring the strength of the received audio tone and transmitting to the respective base station an indication of the measured strength.

13. A telecommunications network comprising:

a plurality of mobile stations, at least one of which is capable of operation in a normal mode and in a base-station-emulation (BSE) mode, the BSE capable mobile station comprising circuitry for switching between normal mode and BSE mode;

a plurality of base stations, each base station communicating with one or more mobile stations; and a mobile switching center communicating with the plurality of base stations;

wherein operation of the mobile stations in normal mode consists of reception over a forward channel and transmission over a reverse channel and operation of the BSE capable mobile station in BSE mode consists of reception over the reverse channel and transmission over the forward channel;

wherein the BSE capable mobile station switches from normal mode into BSE mode upon receiving an instruction from the respective base station whereby the ESE capable mobile station establishes direct communication with another mobile station of the plurality of mobile stations.

14. A telecommunications network according to claim 13, wherein the mobile switching center is adapted, on receipt of an origination message from a first mobile station identifying a second mobile station that the first mobile station wishes to communicate with, to cause transmission of the instruction to the ESE capable mobile station only after the mobile switching center has determined that the BSE capable mobile station is a BSE capable mobile station and that a clear radio link between the BSE capable mobile station and the other mobile station can be maintained.

15. A telecommunications network according to claim 14, wherein the mobile switching center is arranged, on receipt of the origination message, to search a database containing identification numbers of BSE capable mobile stations thereby to determine whether the first or second mobile station is a BSE capable mobile station.

16. A telecommunications network according to claim 14, wherein the mobile switching center determines whether a clear radio link between the first and second mobile stations can be maintained by evaluating the relative positions of the first and second mobile stations and comparing the difference to a threshold.

17. A telecommunications network according to claim 16, wherein the mobile switching center determines whether a clear radio link between the first and second mobile stations can be maintained by evaluating the relative positions of the first and second mobile stations and comparing the difference to a threshold.

18. A telecommunications network according to claim 14, wherein the mobile switching center determines whether a clear radio link between the first and second mobile stations of a cell can be maintained by comparing from a table containing received signal strength indicator (RSSI) entries for pairs of subregions an RSSI value, to a threshold.

19. A telecommunications network according to claim 15, wherein the mobile switching center determines whether a clear radio link between the first and second mobile stations of a cell can be maintained by comparing from a table containing received signal strength indicator (RSSI) entries for pairs of subregions an RSSI value, to a threshold.

20. A telecommunications network according to claim 14, wherein the mobile stations each have circuitry for measuring the strength of received signals and the mobile switching center determines whether a clear radio link between the first and second mobile stations can be maintained by ordering, via the respective base station, the first mobile station to transmit a first predetermined modulated audio tone over a first pre-assigned voice channel;

ordering, via the respective base station, the second mobile station to transmit a second predetermined modulated audio tone over a second pre-assigned voice channel;

the first and second mobile stations receiving and measuring the strength of the second and first modulated audio tones respectively;

the first and second mobile station each sending to the mobile switching center, via the respective base station, a message containing the strength of the received modulated audio tone; and the mobile switching center comparing the relative strengths to a threshold.

21. A telecommunications network according to claim 13, the BSE capable mobile station further comprising circuitry for detecting during operation in BSE mode signalling tone sent by the other mobile station upon terminating the direct communication and for switching the mobile station from BSE mode into normal mode upon detection of the signalling tone and sending another signalling tone to the respective base station thereby to advise the mobile switching center of the termination of direct communication.

22. A telecommunications network according to claim 14, the BSE capable mobile station further comprising circuitry for detecting during operation in BSE mode signalling tone sent by the other mobile station upon terminating the direct communication and for switching the mobile station from BSE mode into normal mode upon detection of the signalling tone and sending another signalling tone to the respective base station thereby to advise the mobile switching center of the termination of direct communication.

23. A telecommunications network according to claim 13, the BSE capable mobile station further comprising circuitry for detecting during operation in BSE mode a supervisory audio tone sent by the other mobile station during the direct communication, for switching the mobile station from BSE mode to normal mode on detecting loss of the supervisory audio tone and for sending a signalling tone to the base station on detecting loss of the supervisory audio tone thereby to advise the mobile switching center of termination of direct communication.

24. A telecommunications network according to claim 14, the BSE capable mobile station further comprising circuitry for detecting during operation in BSE mode a supervisory audio tone sent by the other mobile station during the direct communication, for switching the mobile station from BSE mode to normal mode on detecting loss of the supervisory audio tone and for sending a signalling tone to the base station on detecting loss of the supervisory audio tone thereby to advise the mobile switching center of termination of direct communication.

25. A method of enabling direct communication between first and second mobile stations in a telecommunications network, the network comprising a plurality of mobile stations, at least one of which is capable of operation in a normal mode and in a base-station-emulation (BSE) mode, the BSE capable mobile station comprising circuitry for switching between normal mode and BSE mode; a plurality of base stations, each base station communicating with one or more mobile stations; and a mobile switching center communicating with the plurality of base stations; wherein operation of the mobile station in normal mode consists of reception over a forward channel and transmission over a reverse channel and operation of the mobile station in BSE mode consists of reception over the reverse channel and transmission over the forward channel; wherein the mobile station switches from normal mode into BSE mode upon receiving a indication from the base station, the first and second mobile stations communicating in normal mode with a respective base station among the plurality of base stations, the method comprising:

A) the first mobile station sending, via the respective base station, a message to the mobile switching center indicating that the second mobile station is being called;

B) the mobile switching center sending a page message to the second mobile station via the specific base station;

C) the second mobile station responding to the page message;

D) the mobile switching center determining whether at least one of the first and second mobile stations is capable of operating in BSE mode and identifying the one mobile station that is to operate in BSE mode;

E) the mobile switching center determining whether a clear radio link between the first and second mobile stations can be maintained;

F) if steps d) and e) result in a positive determination, the mobile switching center assigning forward and reverse channels for the call;

G) the mobile switching center sending, via the respective base station, a request message to the mobile station identified in step d) instructing it to operate in BSE mode;

H) the BSE capable mobile station responding to the request message and switching into BSE mode;

I) the BSE capable station establishing a direct call with the other of the first and second mobile stations.

26. A method according to claim 25, wherein the mobile switching center determines whether a clear radio link between the first and second mobile stations can be maintained by evaluating the relative positions of the first and second mobile stations and comparing the difference to a threshold.

27. A method according to claim 25, wherein the mobile switching center determines whether a clear radio link between the first and second mobile stations can be maintained by determining which respective sub-regions of a cell the first and second mobile stations are located on and comparing from a table containing received signal strength indicator (RSSI) entries for pairs of sub-regions an RSSI value to a threshold.

28. A method according to claim 25, wherein the mobile switching center determines whether a clear radio link between the first and second mobile stations can be established by:

ordering, via the respective base station, the first mobile station to transmit a first predetermined modulated audio tone over a first pre-assigned voice channel;

ordering, via the respective base station, the second mobile station to transmit a second predetermined audio tone over a second pre-assigned voice channel;

the first and second mobile stations receiving and measuring the strength of the second and first modulated audio tones respectively;

the first and second mobile stations each sending to the mobile switching center, via the respective base station, a message containing the strength of the received modulated audio tone; and the mobile switching center comparing the result to a threshold.

29. A method according to claim 25, in BSE mode further comprising circuitry for detecting a further comprising, upon termination of the direct call by the mobile station not in BSE mode, the further steps of:

the mobile station not in BSE mode transmitting a first signalling tone and ceasing transmission;

the mobile station in BSE mode detecting the first signalling tone;

the mobile station in BSE mode switching into normal mode; and the mobile station formerly in BSE mode and now in normal mode transmitting a second signalling tone to the respective base station and ceasing transmission.

30. A method according to claim 25, further comprising, upon termination of the direct call by the mobile station not in BSE mode, the further steps of:

the mobile station not in BSE mode ceasing transmission;

the mobile station in BSE mode detecting absence of a supervisory audio tone from the mobile station not in BSE mode;

the mobile station in BSE mode switching into normal mode; and the mobile station formerly in BSE mode and now in normal mode transmitting a signalling tone to the respective base station and ceasing transmission.

31. A method according to claim 25, further comprising, upon termination of the direct call by the mobile station in BSE mode, the further steps of:

the mobile station in BSE mode switching into normal mode;

the mobile station in BSE mode transmitting a signalling tone to the respective base station and ceasing transmission;

the respective base station detecting the signalling tone;

the respective base station sending to the mobile station not in BSE mode a message instructing it to cease transmission; and the mobile station not in BSE mode responding to this message by ceasing transmission.

* * * * *